US 10,117,263 B2

(12) United States Patent
Ahn et al.

(10) Patent No.: US 10,117,263 B2
(45) Date of Patent: Oct. 30, 2018

(54) METHOD FOR RECEIVING DATA AND APPARATUS USING SAME

(71) Applicant: LG Electronics Inc., Seoul (KR)

(72) Inventors: Joonkui Ahn, Seoul (KR); Suckchel Yang, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 77 days.

(21) Appl. No.: 15/124,644

(22) PCT Filed: Mar. 18, 2015

(86) PCT No.: PCT/KR2015/002613
§ 371 (c)(1),
(2) Date: Sep. 8, 2016

(87) PCT Pub. No.: WO2015/142045
PCT Pub. Date: Sep. 24, 2015

(65) Prior Publication Data
US 2017/0019913 A1    Jan. 19, 2017

Related U.S. Application Data

(60) Provisional application No. 61/955,196, filed on Mar. 18, 2014, provisional application No. 61/971,529, (Continued)

(51) Int. Cl.
*H04W 72/12*    (2009.01)
*H04W 28/02*    (2009.01)
(Continued)

(52) U.S. Cl.
CPC ....... *H04W 72/1242* (2013.01); *H04L 5/0046* (2013.01); *H04L 5/0055* (2013.01); (Continued)

(58) Field of Classification Search
CPC ......... H04W 72/1242; H04W 28/0205; H04W 72/10; H04W 72/0446; H04W 72/12; H04L 5/0055; H04L 5/0046
See application file for complete search history.

(56) References Cited

U.S. PATENT DOCUMENTS

2008/0153532 A1* 6/2008 Camp ................ H04L 27/0008
455/522
2010/0296454 A1* 11/2010 Park ..................... H04L 1/1812
370/328
(Continued)

FOREIGN PATENT DOCUMENTS

JP          20065908 A    1/2006
KR   1020050027679 A    3/2005
(Continued)

*Primary Examiner* — Anez Ebrahim
(74) *Attorney, Agent, or Firm* — Dentons US LLP

(57) ABSTRACT

A method of a wireless device connected to multiple base stations to receive data in a wireless communication system is provided. The wireless device detects multiple transports (TBs) being transmitted by the multiple base stations, and determines whether the sum of total bits of the multiple TBs exceeds the maximum TB size supported by the wireless device. If the sum of the total bits of the multiple TBs exceeds the maximum TB size, the wireless device decides, according to a priority, which TBs to receive among the multiple TBs.

7 Claims, 5 Drawing Sheets

Related U.S. Application Data filed on Mar. 28, 2014, provisional application No. 61/994,128, filed on May 16, 2014.

(51) Int. Cl.
| | | |
|---|---|---|
| *H04L 5/00* | (2006.01) | |
| *H04W 72/04* | (2009.01) | |
| *H04W 72/10* | (2009.01) | |
| *H04L 27/26* | (2006.01) | |
| *H04W 88/02* | (2009.01) | |
| *H04W 88/08* | (2009.01) | |

(52) U.S. Cl.
CPC ... *H04W 28/0205* (2013.01); *H04W 72/0446* (2013.01); *H04W 72/10* (2013.01); *H04L 27/2601* (2013.01); *H04W 72/1252* (2013.01); *H04W 88/02* (2013.01); *H04W 88/08* (2013.01)

(56) References Cited

U.S. PATENT DOCUMENTS

| | | | |
|---|---|---|---|
| 2013/0194924 A1 | 8/2013 | Zhang et al. | |
| 2013/0329596 A1* | 12/2013 | Shirakabe | H04W 16/10 370/252 |
| 2016/0255646 A1* | 9/2016 | Bergman | H04W 72/1215 370/329 |

FOREIGN PATENT DOCUMENTS

| | | |
|---|---|---|
| KR | 100772886 B1 | 5/2007 |
| KR | 1020090118796 A | 11/2009 |
| KR | 1020110066320 A | 6/2011 |
| KR | 20140022401 A | 2/2014 |

\* cited by examiner

METHOD FOR RECEIVING DATA AND APPARATUS USING SAME

This application is a National Phase Application of International Application No. PCT/KR2015/002613, filed on Mar. 18, 2015, which claims the benefit of U.S. Provisional Application No. 61/955,196, filed Mar. 18, 2014, U.S. Provisional Application No. 61/971,529, filed Mar. 28, 2014, and U.S. Provisional Application No. 61/994,128, filed May 16, 2014, which are hereby incorporated by reference in their entirety for all purposes as if fully set forth herein.

BACKGROUND OF THE INVENTION

Field of the Invention

The present invention relates to wireless communications, and more particularly, to a method of receiving data by a wireless device connected to a plurality of base stations in a wireless communication system.

Related Art

In a carrier aggregation (CA) supported in $3^{rd}$ generation partnership project (3GPP) long term evolution (LTE)/LTE-advanced (LTE-A), one base station (BS) manages a plurality of serving cells. A scheduler may be one BS even if the plurality of serving cells are configured for a user equipment (UE).

A dual connectivity environment is a case where a plurality of BSs (or a plurality of accesses) is configured for the UE. This may be regarded that the UE is scheduled by a plurality of schedulers.

A representative dual connectivity is a case where a macro BS and a micro BS are configured for the UE. In comparison with the macro BS, the micro BS is a smaller and lower-power BS and has a narrower coverage. It is considered a scenario in which a small and low-power micro BS constitutes a small cell, and many small cells are installed densely in a hot spot area. In comparison with the legacy macro cell, the small cell is characterized of being installable relatively randomly without an accurate cell plan, being movable, and being installable or removable at any time instance.

However, a backhaul connectivity between the plurality of BSs is not ideal. Accordingly, when one UE having access to the plurality of BSs receives data, there is a need to adjust scheduling between the plurality of BSs.

SUMMARY OF THE INVENTION

The present invention provides a method of receiving data by a wireless device connected to a plurality of base stations (BSs) in a wireless communication system.

In an aspect, a method of receiving data by a wireless device connected to a plurality of base stations (BSs) in a wireless communication system is provided. The method includes detecting a plurality of transport blocks (TBs) transmitted by the plurality of BSs, determining whether a sum of total bits of the plurality of TBs exceeds a maximum TB size supported by the wireless device, and if the sum of the total bits of the plurality of TBs exceeds the maximum TB size, deciding a TB to be received among the plurality of TB s according to a priority.

Among the plurality of TBs, a TB scheduled by a macro BS may have a higher priority than a TB scheduled by a micro BS.

In another aspect, an apparatus for receiving data in a wireless communication system is provided. The apparatus includes a radio frequency (RF) unit configured to transmit and receive a radio signal, and a processor coupled to the RF unit and configured to detect a plurality of transport blocks (TBs) transmitted by a plurality of base stations (BSs), determine whether a sum of total bits of the plurality of TB s exceeds a maximum TB size supported by the apparatus, and if the sum of the total bits of the plurality of TBs exceeds the maximum TB size, decide a TB to be received among the plurality of TBs according to a priority.

A downlink data reception error caused by a buffer overflow can be avoided in an environment where a wireless device is connected to a plurality of BSs.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. Alternatively, the wireless device may be a device supporting a data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

It is described hereinafter that the present invention is applied based on 3rd generation partnership project (3GPP) long term evolution (LTE)/LTE-advanced (LTE-A) based on 3GPP TS releases 8-11. This is for exemplary purposes only, and the present invention is also applicable to various wireless communication systems. In the following description, LTE and/or LTE-A are collectively referred to as LTE.

A wireless device may be served by a plurality of serving cells which is managed by one base station. Each serving cell may be defined by one downlink (DL) component carrier (CC) or a pair of a DL CC and an uplink (UL) CC.

A serving cell may be classified into a primary cell (hereinafter referred to as 'PCell') and a secondary cell (hereinafter referred to as 'SCell'). The PCell is a cell which operates at a primary frequency, performs an initial connection establishment procedure, starts a connection reestablishment procedure, or is designated as a PCell in a handover procedure. The PCell refers to a reference cell. The SCell may operate at a secondary frequency, may be configured after a Radio Resource Control (RRC) connection is established, and may be used to provide additional radio resources. Substantially, at least one PCell may be configured, and the SCell may be added/corrected/released according to uplink layer signaling (e.g., radio resource control (RRC)).

A cell index (CI) of the PCell may be fixed. For example, the lowest CI may be designated as the CI of the PCell. Hereinafter, a CI of the PCell is 0, and a CI of the SCell is sequentially allocated from 1.

Figure 1:
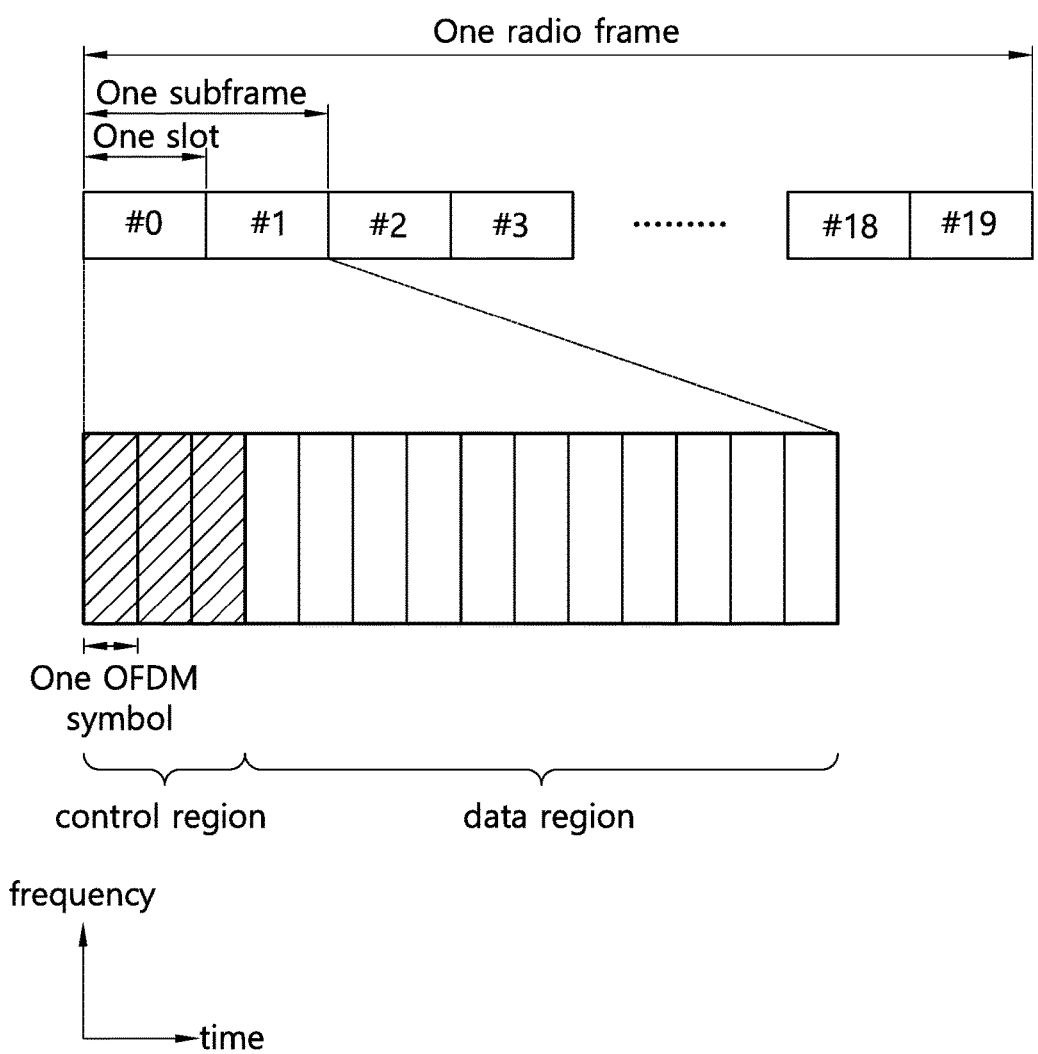
FIG. 1 shows a downlink radio frame structure in $3^{rd}$ generation partnership project (3GPP) long term evolution-advanced (LTE-A).

FIG. 1 shows a structure of a downlink radio frame in 3GPP LTE-A. The section 6 of 3GPP TS 36.211 V10.2.0 (2011-06) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V10.2.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A downlink (DL) subframe is divided into a control region and a data region in the time domain. The control region includes up to first four OFDM symbols of a 1st slot in the subframe. However, the number of OFDM symbols included in the control region may vary. A physical downlink control channel (PDCCH) and other control channels are allocated to the control region, and a physical downlink shared channel (PDSCH) is allocated to the data region.

DL control channels are described as follows.

As disclosed in 3GPP TS 36.211 V10.2.0, the 3GPP LTE/LTE-A classifies a physical control channel into a physical downlink control channel (PDCCH), a physical control format indicator channel (PCFICH) and a physical hybrid-ARQ indicator channel (PHICH).

The PCFICH transmitted in a 1st OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

Unlike the PDCCH, the PCFICH is transmitted by using a fixed PCFICH resource of the subframe, without having to perform blind decoding.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the UE is transmitted on the PHICH.

A physical broadcast channel (PBCH) is transmitted in first four OFDM symbols in a 2nd slot of a 1st subframe of a radio frame. The PBCH carries system information necessary for communication between the UE and the BS. The system information transmitted through the PBCH is referred to as a master information block (MIB). In comparison thereto, system information transmitted on the PDCCH indicated by the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

The 3GPP LTE/LTE-A uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

In 3GPP LTE-A, uplink (UL) channels include a physical uplink control channel (PUCCH) and a physical uplink shared channel (PUSCH).

Figure 2:
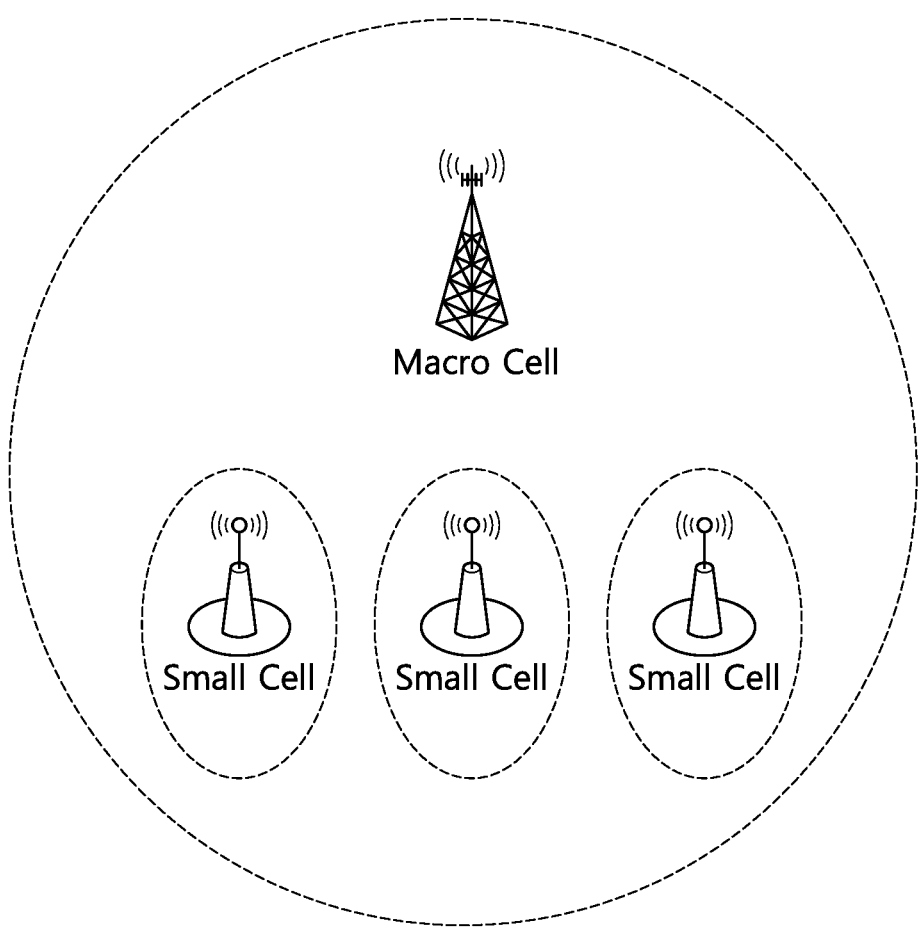
FIG. 2 shows a scenario of configuring a plurality of base stations.

FIG. 2 shows a scenario of configuring a plurality of BSs.

For clarity, it is assumed that a macro BS configures a macro cell, and a micro BS configures a small cell. Although it is exemplified that one BS configures one cell, it is also possible that one BS configures a plurality of cells.

A cell for managing one or more small cells is called a master small cell. When the small cell and the macro cell co-exist in the same coverage, the macro cell manages the small cell by being connected via a backhaul to each small cell or to the master small cell.

A wireless device may receive downlink (DL) data by simultaneously accessing the macro cell and the small cell. In this case, a real-time coordination between a macro cell scheduler and a small cell scheduler may be difficult due to a backhaul delay or the like between the macro cell and the small cell.

It is assumed hereinafter that the wireless device has access to a $1^{st}$ BS and a $2^{nd}$ BS, and receives DL data from the $1^{st}$ and $2^{nd}$ BSs. The $1^{st}$ BS and the $2^{nd}$ BS individually perform DL scheduling, and are connected via a backhaul. The $1^{st}$ BS may be a macro BS, and the $2^{nd}$ BS may be a micro BS. Alternatively, the $1^{st}$ BS may be a BS for managing a primary cell, and the $2^{nd}$ BS may be a BS for managing a secondary cell.

The present invention proposes rate matching and buffering so that the wireless device receives DL data from the $1^{st}$ and $2^{nd}$ BSs.

In a wireless communication system, a category is designated according to a receivable data size of the wireless device. The following table shows the category of the wireless device in 3GPP LTE/LTE-A.

TABLE 1

| category | maximum transport block size to be received within TTI (bit) | total number of soft channel bits | maximum number of supported layers for spatial multiplexing |
| --- | --- | --- | --- |
| 1 | 10296 | 250368 | 1 |
| 2 | 51024 | 1237248 | 2 |
| 3 | 75376 | 1237248 | 2 |
| 4 | 75376 | 1827072 | 2 |
| 5 | 149776 | 3667200 | 4 |
| 6 | 149776 (4layers), 75376 (2layers) | 3654144 | 2 or 4 |
| 7 | 149776 (4layers), 75376 (2layers) | 3654144 | 2 or 4 |
| 8 | 299865 | 35982720 | 8 |

The maximum number of bits of a transport block (TB) that can be decoded within one TTI by the wireless device is predetermined for each category. If a real-time scheduling coordination is difficult between different BSs, a maximum TB size may be exceeded. This may cause a serious decoding error.

To begin with, it is proposed a method of adjusting a soft buffer size between BSs so as not to exceed a maximum TB size.

Figure 3:
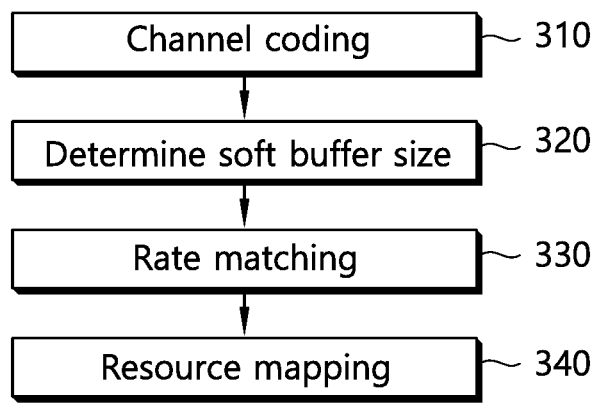
FIG. 3 shows an example of configuring a data channel for a downlink (DL) transport block.

FIG. 3 shows an example of configuring a data channel for a DL transport block.

First, a BS encodes an input information bit (310). Although there is no restriction in a channel coding scheme, well-known turbo coding may be applied.

The BS determines a soft buffer size for a corresponding wireless device (320). A transmitter determines the soft buffer size for rate matching in order to avoid a mismatch when the number of soft bits used to determine a DL channel exceeds a maximum soft buffer size of a receiver, and in order to effectively manage a redundancy bit in an HARQ operation.

The BS performs the rate matching according to the determined soft buffer size (330). A rate-matched coding block is mapped to a resource (340), and is then transmitted to the wireless device.

According to the section 5.1.4.1.2 of 3GPP TS 36.212 V11.4.0 (2013-12), a soft buffer size $N_{IR}$ is determined as follows.

$$N_{IR} = \left\lfloor \frac{N_{soft}}{K_C \cdot K_{MIMO} \cdot \min(M_{DL\_HARQ}, M_{limit})} \right\rfloor \quad \text{[Equation 1]}$$

Herein, $N_{soft}$ is the total number of soft channel bits of Table 1, $K_{MIMO}$ is a parameter which varies depending on whether to perform MIMO transmission, $M_{DL\_HARQ}$ is the maximum number of DL HARQ processes, and $M_{limit}$ is a constant.

$K_C$ is a value which varies depending on $N_{soft}$. More specifically, if $N_{soft}$=35982720, $K_C$=5. If $N_{soft}$=3654144 and no more than two layers are supported, $K_C$=2. Otherwise, $K_C$=1.

If the soft buffer size $N_{IR}$ is determined for each cell (or each BS) and if the wireless device is capable of receiving a PDSCH through a plurality of cells, a total sum of buffer sizes for the respective cells may exceed a maximum buffer size. However, if the plurality of cells belong to one BS, a buffer overflow problem can be avoided since a scheduling coordination is possible between cells.

However, a problem may occur when cells belong to different BSs or a backhaul between the cells is not fast enough to support a real-time scheduling coordination.

According to one embodiment of the present invention, it is provided a method by which a sum of buffer sizes for respective BSs (or respective cells belonging to the BSs) does not exceed a maximum buffer size of a wireless device when the wireless device has access to the plurality of BSs.

According to another embodiment of the present invention, it is provided an operation of a wireless device when a sum of buffer sizes exceeds a maximum soft buffer size of a UE.

To begin with, the method by which the sum of the buffer sizes for the respective BSs does not exceed the maximum buffer size is as follows.

First, a total buffer size may be allocated for each BS. $N_{soft}$ equivalent to the total buffer size of the wireless device may be assigned for each BS, and rate matching may be performed for each BS.

It is assumed that $N_{soft,i}$ denotes a total buffer size for an $i^{th}$ BS. $N_{soft,i}$ may be determined as follows.

1-i) $N_{soft}$ may be divided by the number of BSs to guarantee the same buffer size for each BS.

1-ii) $N_{soft,i}$ 1 may be divided by a value greater than 1 to guarantee a buffer size that can be at least exclusively used by each BS.

1-iii) $N_{soft}$ may be divided according to the number of cells belonging to each BS, a bandwidth, and the maximum number of HARQ processes.

1-iv) The value $N_{soft,i}$ may be reported by the BS directly to the wireless device.

1-v) A total buffer size $N_{soft}$ may be applied to a designated BS (e.g., a macro BS), and one of the options 1-i) to 1-iv) or a combination thereof may be applied to the remaining BSs (e.g., a micro BS).

In the above options, the allocation may be achieved such that a total sum of buffer sizes of BSs exceeds a total buffer size.

Second, the total buffer size may be divided for each BS.

In the conventional equation 1, a buffer size to be used for each BS may be divided from the total buffer size $N_{soft}$ by using a parameter $K_C$ or by using a parameter additionally provided as a denominator.

More specifically, if the value $K_C$ is greater than or equal to the number of BSs, a total sum of buffer sizes allocated to the respective BSs may not exceed the total buffer size. If the value $K_C$ is less than the number of BSs, the following detailed methods may be applied.

2-i) The value $K_C$ is set to be equal to the number of BSs.

2-ii) It is set to $K_C$>1 to guarantee a buffer size that can be at least exclusively used by each BS.

2-iii) The value $K_C$ may be determined according to the number of cells belonging to each BS, a bandwidth, and the maximum number of HARQ processes. For example, when a $1^{st}$ BS has two cells and a $2^{nd}$ BS has three cells, $K_C$=5/3 may be applied for the $1^{st}$ BS, and $K_C$=5/2 may be applied for the $2^{nd}$ BS.

2-iv) The value $K_C$ for each BS may be reported by the BS directly to the wireless device.

2-v) The existing $K_C$ may be directly applied to a designated BS (e.g., a macro BS), and one of the options 2-i) to 2-iv) or a combination thereof may be applied to the remaining BSs (e.g., a micro BS).

In the above options, the allocation may be achieved such that a total sum of buffer sizes of BSs exceeds a total buffer size.

Third, an operation in which a wireless device having access to a plurality of BSs receives DL data simultaneously may be allowed when a specific condition is satisfied.

The above condition may be a case where the value $K_C$ has a specific value (2 or 5), or the value $K_C$ is equal to or greater than the number of BSs. If the soft buffer size is divided so as to be identifiable for each cell, since it can be used for each BS without an additional identification, an access operation for the plurality of BSs may be allowed only when the condition is satisfied.

Alternatively, the access operation for the plurality of BSs may be allowed only for a wireless device corresponding to a category having a soft buffer size satisfying the above condition.

Meanwhile, in 3GPP LTE, the total buffer size varies depending on a transmission mode configured in a corresponding cell. If the wireless device supports a buffer size corresponding to at least Release 11, whether to perform rate matching on the basis of a corresponding buffer size or whether to perform rate matching on the basis of a buffer size of a previous release is determined according to whether the BS supports a corresponding release.

In a dual connectivity environment, since a micro BS is used to increase a data processing rate in general, it is desirable to support a maximum suffer size. Therefore, if the wireless device supports at least Release 11 and is configured to a specific transmission mode (e.g., a transmission mode 9 or 10), a cell belonging to the micro BS may perform rate matching on the basis of a buffer size of a corresponding release.

If an operation that can be supported in at least a specific release is configured to the wireless device, rate matching may be performed on the basis of a buffer size supported in the specific release as to not only a corresponding cell but also another cell simultaneously accessed by the wireless device, or as to cells belonging to another BS.

Meanwhile, as shown in Table 1 above, not only the total number of soft channels but also a maximum TB size is predetermined for each category of the wireless device. That is, the maximum number of bits of a TB that can be decoded within one TTI by the wireless device is also limited for each category.

If a real-time scheduling coordination is difficult between a plurality of BSs, a sum of total bits of TBs to be scheduled within one TTI may exceed the maximum TB size. In order for the total number of bits of the TBs received from the plurality of BSs to be less than or equal to the maximum TB size, the following method is proposed.

3-i) The maximum TB size may be divided by the number of BSs to guarantee the same TB size for each BS.

3-ii) The maximum TB size may be divided by a value greater than 1 to guarantee a TB size that can be at least exclusively used by each BS.

3-iii) The maximum TB size may be divided according to the number of cells belonging to each BS, a bandwidth, and the maximum number of HARQ processes.

3-iv) The maximum TB size for each BS may be reported by the BS directly to the wireless device.

3-v) The maximum TB size may be directly applied to a designated BS (e.g., a macro BS), and one of the options 3-1 to 3-iv) or a combination thereof may be applied to the remaining BSs (e.g., a micro BS).

In the above options, a sum of total bits of a TB to be scheduled by the BSs may exceed the maximum TB size.

Figure 4:
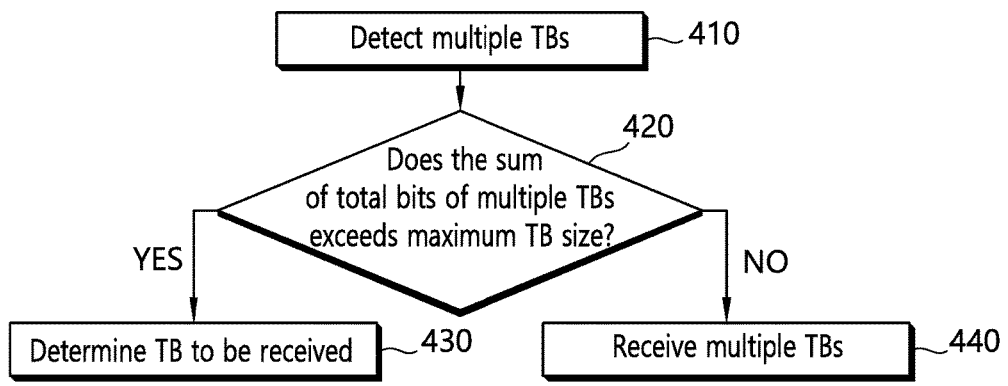
FIG. 4 is a flowchart showing a method of receiving data according to an embodiment of the present invention.

FIG. 4 is a flowchart showing a method of receiving data according to an embodiment of the present invention. This method may be performed by a wireless device having access to a plurality of BSs.

The wireless device detects a transport block (TB) transmitted by the plurality of BSs (410).

The wireless device determines whether a sum of total bits of the plurality of TBs exceeds a maximum TB size supported by the wireless device (420).

If the sum of the total bits of the plurality of TBs exceeds the maximum TB size, the wireless device determines a TB to be received among the plurality of TBs (430). If not exceeding the maximum TB size, the wireless device receives and decodes the TB to be received among the plurality of TBs (440).

If a sum of buffer sizes exceeds a maximum soft buffer size of the UE or if a sum of total bits of a TB to be scheduled exceeds a maximum TB size, an operation of the wireless device may be as follows.

In a first embodiment, the wireless device may ignore all PDSCHs (initially) scheduled in a corresponding subframe or may not perform buffering.

In a second embodiment, the wireless device may ignore PDSCHs (initially) scheduled within a range exceeding a maximum total bit number in a corresponding subframe or may not perform buffering. The wireless device may receive the PDSCH according to the following priority in unit of a BS or in unit of a cell.

First, the wireless device may preferentially receive a PDSCH scheduled by a macro BS. In particular, a PDSCH scheduled through a primary cell may be preferentially received.

Second, the wireless device may preferentially receive a PDSCH scheduled through a cell playing a role of a primary cell among PDSCHs scheduled by a micro BS.

Third, the wireless device may more preferentially receive a PDSCH detected from a common search space (CSS) than a PDSCH detected from a UE-specific search space (USS).

Fourth, the wireless device may preferentially receive a PDSCH scheduled with RA-RNTI or temporary C-RNTI.

Fifth, the wireless device may more preferentially receive a PDSCH detected using SPS-RNTI than a PDSCH detected using C-RNTI.

Sixth, a priority of PDSCH reception may be indicated through a PDCCH for scheduling a PDSCH. For example, the reception priority may be indicated by adding a bit field to the PDCCH.

In the above method, an operation to be performed on a PDSCH of which reception is discarded by the wireless device may be the same as the operation performed on a case where a PDCCH for scheduling the PDSCH is not detected. That is, in HARQ ACK/NACK transmission for the PDSCH, an operation corresponding to DTX is performed similarly to the case where the PDCCH is not received. More specifically, the following operation may be performed.

In PUCCH format 1b channel selection, a constellation corresponding to DTX is used for the PDSCH.

A NACK constellation is used for a PUCCH format 3.

A PUCCH format 1a/1b is not transmitted.

A transmit power command (TPC) transmitted through the PDCCH is ignored or applied.

If the total number of bits of a PDSCH scheduled within one TTI exceeds the maximum TB size of the wireless device, the wireless device may discard reception (or decoding) of some of the scheduled PDSCHs. If the BS does not know that the wireless device discards the PDSCH reception, the BS may incorrectly decide that the wireless device has failed in the PDSCH decoding due to a poor channel state or the like. In order to avoid the incorrect decision of the BS and to facilitate a scheduling coordination between the BSs, if a to-be-scheduled buffer size or a to-be-scheduled TB size exceeds a device capability, corresponding information may be reported to the BS.

The wireless device may deliver the following information to a BS, which has scheduled the PDSCH of which reception is dropped, or to a macro BS.

1) Information reporting that reception of a PDSCH is dropped due to exceeding capability: This may be 1-bit information, and may be transmitted as ACK/NACK corresponding to the PDSCH or together with the ACK/NACK. This information may be transmitted to the BS which has scheduled the PDSCH.

2) Statistic information when PDSCH reception is dropped due to exceeding capability: The wireless device may report statistic information such as the number (or number of occurrences) of PDSCHs to be dropped due to exceeding capability during a specific duration and/or the exceeded number of TB bits or the like to the BS. The statistic information may be transmitted as a MAC message or an RRC message. This information may be transmitted to the BS, which has scheduled the PDSCH, or to the macro BS.

The above methods may be applied not only to a case of exceeding a DL TB size but also to a case where PUSCH transmission is discarded since the total number of bits of a UL TB to be scheduled exceeds the maximum TB size or a case where PUSCH transmission is prioritized.

Figure 5:
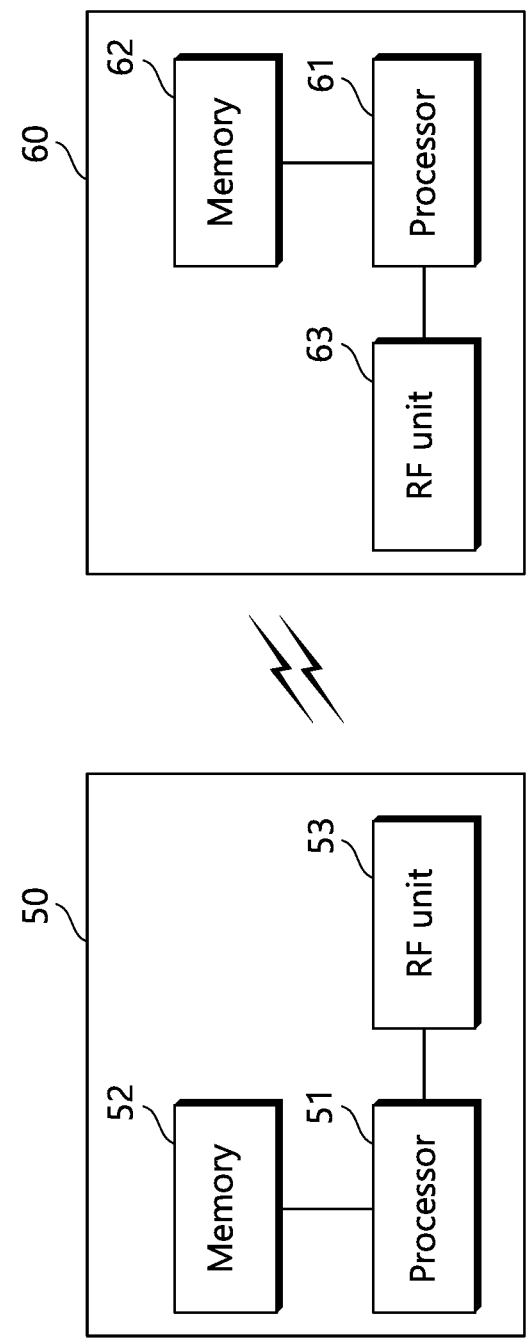
FIG. 5 is a block diagram showing a wireless communication system according to an embodiment of the present invention.

FIG. 5 is a block diagram showing a wireless communication system according to an embodiment of the present invention.

A BS 50 includes a processor 51, a memory 52, and a radio frequency (RF) unit 53. The memory 52 is operatively coupled to the processor 51 to store a variety of information for driving the processor 51. The RF unit 53 is operatively coupled to the processor 51 to transmit and/or receive a radio signal. The processor 51 implements the proposed functions, procedures, and/or methods. In the aforementioned embodiment, an operation of the BS may be implemented by the processor 51.

A wireless device 60 includes a processor 61, a memory 62, and an RF unit 63. The wireless device 60 may be a half-duplex device or a full-duplex device. The memory 62 is operatively coupled to the processor 61 to store a variety of information for driving the processor 61. The RF unit 63 is operatively coupled to the processor 61 to transmit and/or receive a radio signal. The processor 61 implements the proposed functions, procedures, and/or methods. In the aforementioned embodiment, an operation of the wireless device may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of receiving transport blocks (TBs) by a wireless device connected to a plurality of base stations (BSs) in a wireless communication system, the method comprising:
    detecting a plurality of TBs transmitted by the plurality of BSs;
    determining whether a sum total of bits of the plurality of TBs exceeds a maximum TB size supported by the wireless device;
    when the sum total of the bits of the plurality of TBs exceeds the maximum TB size,
    deciding to receive a first TB among the plurality of TBs and to drop a second TB among the plurality of TBs according to a priority, and
    transmitting information indicating the sum total of bits exceeds the maximum TB size to one of the plurality of BSs which schedules the second TB,
    wherein the information includes the number of bits of the second TB within one transmission time interval (TTI).

2. The method of claim 1, wherein among the plurality of TBs, a TB scheduled by a macro BS has a higher priority than a TB scheduled by a micro BS.

3. The method of claim 1, wherein among the plurality of TBs, a TB detected from a common search space has a higher priority than a TB detected from a user equipment (UE)-specific space.

4. The method of claim 1, wherein a transmission of a hybrid automatic repeat request (HARQ) acknowledgement (ACK)/non-acknowledgement (NACK) corresponding to the second TB is dropped.

5. An apparatus for receiving transport blocks (TBs) in a wireless communication system, the apparatus comprising:
    a transmitter and a receiver; and
    a processor, operatively coupled to the transmitter and the receiver, that:
    detects a plurality of TBs transmitted by a plurality of base stations (BSs);
    determines whether a sum total of bits of the plurality of TBs exceeds a maximum TB size supported by the apparatus;
    when the sum total of the bits of the plurality of TBs exceeds the maximum TB size,
    decides to receive a first TB among the plurality of TBs and to drop a second TB among the plurality of TBs according to a priority, and
    controls the transmitter to transmit information indicating the sum total of bits exceeds the maximum TB size to one of the plurality of BSs which schedules the second TB,
    wherein the information includes the number of bits of the second TB within one transmission time interval (TTI).

6. The apparatus of claim 5, wherein among the plurality of TBs, a TB scheduled by a macro BS has a higher priority than a TB scheduled by a micro BS.

7. The apparatus of claim 5, wherein among the plurality of TBs, a TB detected from a common search space has a higher priority than a TB detected from a user equipment (UE)-specific space.

* * * * *